(12) United States Patent
Silberstein et al.

(10) Patent No.: US 11,087,045 B1
(45) Date of Patent: Aug. 10, 2021

(54) APPARATUS AND METHOD FOR OPTION DATA OBJECT PERFORMANCE PREDICTION AND MODELING

(71) Applicant: Groupon, Inc., Chicago, IL (US)

(72) Inventors: Leopold Silberstein, Chicago, IL (US); Addhyan Pandey, Chicago, IL (US); Abhaya Parthy, Palo Alto, CA (US); Boris Lerner, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 656 days.

(21) Appl. No.: 15/840,364

(22) Filed: Dec. 13, 2017

Related U.S. Application Data (60) Provisional application No. 62/434,163, filed on Dec. 14, 2016.

(51) Int. Cl.
*G06F 30/20* (2020.01)
*G06F 111/02* (2020.01)
*G06F 111/10* (2020.01)

(52) U.S. Cl.
CPC .......... *G06F 30/20* (2020.01); *G06F 2111/02* (2020.01); *G06F 2111/10* (2020.01)

(58) Field of Classification Search
CPC ... G06F 30/20; G06F 2111/02; G06F 2111/10
USPC .......................................................... 703/2
See application file for complete search history.

(56) References Cited

U.S. PATENT DOCUMENTS 8,655,695 B1 * 2/2014 Qu .................... G06Q 30/0251
705/14.49

OTHER PUBLICATIONS

Huang_2015 (Video Advertisement Mining for Predicting Revenue Using Random Forest, Spring 2015 Purdue University) (Year: 2015).*
Vanderveld_2016 (An Engagement-Based Customer Lifetime Value System for E-commerce, KDD Aug. 13-17, 2016, 2016 San Francisco ACM). (Year: 2016).*
DZONE_2017 (CART and Random Forest for Practitioners, Feb. 10, 2017 Big Data Zone downloaded from https://dzone.com/articles/cart-and-random-forests#:-:text=Random Forest creates multiple CART,and then combines the predictions.&text=A bootstra . . . ) (Year: 2017).*

* cited by examiner

*Primary Examiner* — Brian S Cook
(74) *Attorney, Agent, or Firm* — Alston & Bird LLP (57) ABSTRACT

An apparatus, method, and computer program product are provided to predict and model the performance of option data objects prior to the introduction of such option data objects into a network environment through the application of specific rule sets that are applied in a multi-stage arrangement on sets of extracted option data object parameters. In some example implementations, option data object parameters are extracted and parsed into sets of categorical and non-categorical parameters, which may be both quantitative and qualitative, and transmitted to one or more predictive models. Through the operation of the predictive models, the option data object parameters are transformed into a weighted value associated with the option data object that reflects a predicted performance level of the option data object and can be used when comparing multiple option data objects against each other.

23 Claims, 4 Drawing Sheets

APPARATUS AND METHOD FOR OPTION DATA OBJECT PERFORMANCE PREDICTION AND MODELING

CROSS-REFERENCE TO RELATED APPLICATIONS

This application claims the benefit of U.S. Provisional Application No. 62/434,163, titled "Apparatus and Method for Option Data Object Performance Prediction and Modeling," filed Dec. 14, 2016, which is incorporated by reference herein in its entirety.

TECHNICAL FIELD

An example embodiment relates generally to systems that allow for the modeling and prediction of the performance of data objects within a network environment in an efficient manner. Example implementations are particularly directed to systems, methods, and apparatuses for modeling and predicting the likely rates of selection of option data objects based on one or more extracted option data object parameters and related particularized rule sets.

BACKGROUND

Many users of mobile devices now rely heavily on the use of such mobile devices to identify, obtain information about, and interact with third-party systems and other entities. While ever-increasing volumes of data and system resources are available to users of mobile devices, practical and behavioral considerations, such as the useable screen area of a display and restrictions imposed by users on the amount of time they are willing to seek out particular types of information, often impose limitations on the volume of data objects that can be effectively presented to a user. The inventors of the invention disclosed herein have identified these and a number of additional technical and operational challenges to be addressed in a variety of contexts, and have developed the solutions disclosed herein to overcome such challenges.

BRIEF SUMMARY

An apparatus, computer program product, and method are therefore provided in accordance with an example embodiment in order permit the efficient prediction and modeling of the performance of option data objects, particularly with respect to option data objects that have not previously been introduced into a particular network environment. In this regard, the method, apparatus and computer program product of an example embodiment provide for the calculation of one or more weighted values that can be associated with a new option data object based on a set of predictive models and rules associated with such models and extracted option data object parameters.

In an example embodiment, an apparatus is provided, the apparatus comprising a processor and a memory, the memory comprising instructions that configure the apparatus to: receive an option data object; extract from the option data object a set of option data object parameters, wherein the option data object parameters include a set of categorical parameters and a set of non-categorical parameters; separate the set of categorical parameters from the set of non-categorical parameters; transmit to a first predictive model the set of categorical parameters, wherein the first predictive model comprises a classification and regression tree (CART) model; receive from the first predictive model a first weighted value associated with the option data object; transmit to a second predictive model the first weighted value and the set of non-categorical parameters, wherein the second predictive model comprises a random forest model; receive from the second predictive model a second weighted value associated with the option data object, wherein the second weighted value comprises a predicted performance level of the option data object; modify a data record associated with the option data object to include the second weighted value; and based at least in part on the modified data record, cause a reallocation of a set of resources associated with the option data object.

In some example implementations of such an apparatus, the set of categorical parameters comprises an identification of a location associated with the option data object. In some such example implementations, and in other example implementations, the set of non-categorical parameters comprises an identification of a structure of the option data object.

In some example implementations, the predicted performance level is a predicted selection rate of the option data object. In some such example implementations the predicted selection rate of the option data object is a predicted rate at which a plurality of users of a network will select the option data object within a predefined period of time after an introduction of the option data object into the network. In some such example implementations, and in other example implementations, modifying a data record associated with the option data object to include the second weighted value comprises associating the predicted selection rate with the set of option data object parameters.

In some example implementations, causing a reallocation of a set of resources associated with the option data object comprises assigning a set of impressions to an option data object.

In another example embodiment, a computer program product is provided, the computer program product comprising at least one non-transitory computer-readable storage medium having computer-executable program code instructions stored therein, the computer-executable program code instructions comprising program code instructions configured to: receive an option data object; extract from the option data object a set of option data object parameters, wherein the option data object parameters include: a set of categorical parameters and a set of non-categorical parameters; separate the set of categorical parameters from the set of non-categorical parameters; transmit to a first predictive model the set of categorical parameters, wherein the first predictive model comprises a classification and regression tree (CART) model; receive from the first predictive model a first weighted value associated with the option data object; transmit to a second predictive model the first weighted value and the set of non-categorical parameters, wherein the second predictive model comprises a random forest model; receive from the second predictive model a second weighted value associated with the option data object, wherein the second weighted value comprises a predicted performance level of the option data object; and modify a data record associated with the option data object to include the second weighted value.

In some example implementations of such a computer program product, the set of categorical parameters comprises an identification of a location associated with the option data object. In some such example implementations, and in other example implementations, the set of non-categorical parameters comprises an identification of a structure of the option data object.

In some example implementations, the predicted performance level is a predicted selection rate of the option data object. In some such example implementations the predicted selection rate of the option data object is a predicted rate at which a plurality of users of a network will select the option data object within a predefined period of time after an introduction of the option data object into the network. In some such example implementations, and in other example implementations, modifying a data record associated with the option data object to include the second weighted value comprises associating the predicted selection rate with the set of option data object parameters.

In some example implementations, causing a reallocation of a set of resources associated with the option data object comprises assigning a set of impressions to an option data object.

In another example embodiment, a method for option data object performance prediction and modeling is provided, the method comprising: receiving an option data object; extracting from the option data object a set of option data object parameters, wherein the option data object parameters include: a set of categorical parameters and a set of non-categorical parameters; separating the set of categorical parameters from the set of non-categorical parameters; transmitting to a first predictive model the set of categorical parameters, wherein the first predictive model comprises a classification and regression tree (CART) model; receiving from the first predictive model a first weighted value associated with the option data object; transmitting to a second predictive model the first weighted value and the set of non-categorical parameters, wherein the second predictive model comprises a random forest model; receiving from the second predictive model a second weighted value associated with the option data object, wherein the second weighted value comprises a predicted performance level of the option data object; and modifying a data record associated with the option data object to include the second weighted value.

In some example implementations of such a method, the set of categorical parameters comprises an identification of a location associated with the option data object. In some such example implementations, and in other example implementations, the set of non-categorical parameters comprises an identification of a structure of the option data object.

In some example implementations, the predicted performance level is a predicted selection rate of the option data object. In some such example implementations the predicted selection rate of the option data object is a predicted rate at which a plurality of users of a network will select the option data object within a predefined period of time after an introduction of the option data object into the network. In some such example implementations, and in other example implementations, modifying a data record associated with the option data object to include the second weighted value comprises associating the predicted selection rate with the set of option data object parameters.

In some example implementations, causing a reallocation of a set of resources associated with the option data object comprises assigning a set of impressions to an option data object.

BRIEF DESCRIPTION OF THE DRAWINGS

Having thus described certain embodiments of the present invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Various embodiments of the present invention are directed to improved apparatuses, methods, and computer readable media for predicting and modeling the performance of option data objects, which, in some implementations, involves the extraction of a set of option data object parameters to drive one or more predictive models to predict the likely rate at which an option data object that is newly introduced into a network environment will be selected by network users. In this regard, embodiments of the present invention provide systems, devices, and frameworks that employ predictive models and the application of specific rule sets associated with such models to develop one or more weighted values that may be associated with an option data object.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "client" and/or "content source" refers to an individual or entity that is a source, and/or is associated with one or more sources, of an option data object, content contained within an option data object, and/or content to be displayed in connection with an option data object. For example, a content source and/or client may be the owner and/or operator of a system that uses option data objects (such as in the form of deal offers) to encourage users to select a particular option data object to exercise the option contained in the option data object, and generates, acquires, and/or otherwise facilitates the acquisition of data to be included in an option data object.

As used herein, the term "viewer" refers to an individual or other entity that views and/or otherwise interacts with a rendering of one or more option data objects on a mobile device via a user interface, and by doing so, may interact with systems and/or other entities associated with a content source. Depending on the implementations of the particular systems associated with a viewer and/or a content source, a viewer may be able to make and communicate selections from a rendered set of option data objects via an interface directly and/or indirectly to a content source and/or other related system or entity.

As used herein, "option data object" may include one or more data sets or the like which are associated with a content source and reflect an optional action that can be elected by a user, to cause the performance of an action at a location associated with the content source. An option data object may also include a set of parameters associated with the optional action and/or the content source, including but not limited to characteristics of the option data object and the optional action underlying the option data object, the requirements associated with the optional action, timing aspects associated with the option data object and/or optional action, a weighted value, such as a weighted value produced by a predictive model, and an indication of an option data object location and/or source.

Many particularly advantageous implementations of embodiments of the invention arise in contexts and situations that involve the transmission and presentation to a user of a mobile device of option data objects that are in the form of deal offers (such as offers to purchase goods, services, and/or other resources at a discounted price or in connection with other benefits, for example). In many such example implementations, deals are associated with a particular entity, such as a restaurant, retailer, service provider, or other provider. Upon selection of a particular deal offer, the user may be enabled to derive the benefit of the deal offer.

One of the technical challenges that is typical in such contexts and situations involves the transmission and presentation of deal offers that are not of interest to the user. This operational challenge is compounded when the presentation of such low-interest deal offers to the user crowds out other deal offers from the limited display space on a user's mobile device and/or otherwise degrades the user experience associated with applications and/or other software with which the user may be exposed to and interact with deal offers.

One approach to limiting the number of low-interest deal offers or other low-performing option data objects is the ranking of deal offers or other option data objects. However, the ranking process itself imposes a number of technical and operational challenges. One class of challenges imposed by attempts at ranking can be characterized as an "Explore-Exploit" challenge. In general, Explore-Exploit challenges are particularly prevalent in situations where there are finite resources and/or other impediments to exposing option data objects to user. In many situations that involve the presentation of option data objects to a user, the ability to present a deal offer or other option data object to a user is a limited resource. In such situations, each opportunity to present a deal offer or other option data object to user may be referred to as an "impression", and the number of impressions that are available at a given time is finite. Limitations on the number of available impressions may be imposed by technical limitations, (such as the screen area of a mobile device and/or the ability of a mobile device to clearly render option data objects on a display of the mobile device, for example), or behavioral limitations (such as the relatively short period of time a given user may be willing to devote to assessing and choosing amongst a set of deal offers and/or other option data objects, for example).

In general, impressions can be used by a system in two different modes. In the first mode, which may be referred to as "Explore", impressions are used with new option data objects that have not previously been presented to users or otherwise made available to users. As a new option data object is afforded additional impressions, the likely future performance of the option data object can be assessed, based in large part on the performance of the option data object during the period of time during which the option data object was afforded impressions in the Explore mode. Given sufficient time and sufficient impressions, a threshold confidence level in the likely future performance of the option data object (such as confidence in how "good" a particular new deal offer may be) can be achieved. In many contexts, the costs associated with exploration are high, particularly in situations where option data objects tend to have a long tail, in the sense that past performance data can continue to cause the option data object to be afforded impressions after the option data object ceases to be popular. Moreover, in contexts where few option data objects perform well, the relatively high percentage of low-performing option data objects can cause further increases in the resource costs associated with exploration.

In the second mode, which may be referred to as "Exploit", impressions can be assigned to option data objects with a known likely performance level and/or a known previous performance level, such that option data objects that are expected to perform highly can be presented to users. For example, deal offers that are known to be popular with particular users or groups of users can be ranked highly or otherwise set to be presented with greater frequency to users who are likely to select the deal offer. In situations where multiple impressions are available at a given time, some option data objects may be afforded impressions in an Exploit-type mode, while other option data objects, such as new option data objects, may be afforded impressions in an Explore-type mode.

It will be appreciated that one approach to assessing overall system performance and/or the effective use of finite impression resources is to attempt to operate in an Exploit-based mode as much as possible, as such a mode tends to optimize short-term system performance in the sense that more users are more likely to select the deal offers or other option data objects that are presented to them via the finite number of impressions available to the system. However, when system performance is assessed over a longer time period, it is often essential to ensure that there is a sufficient supply of deal offers or other option data objects with known and/or likely performance levels, such that a stable supply of deal offers or other option data objects is available to "exploit". Consequently, new deal offers or other option data objects must be explored (i.e., afforded impressions) as they become available to permit the classification of such new option data objects (such as determining whether a deal offer is considered good or bad, for example). As such, one of the challenges identified by the inventors and addressed by example implementations of embodiments of the invention disclosed herein is the maximization of the effective use of Explore-based impressions such that they are mostly directed to deal offers or other option data objects that are likely to be selected by users and subsequently associated with additional impressions in an Exploit mode.

Moreover, building and running the models used in connection with opportunity prediction is time consuming and otherwise resource intensive. Moreover, particularly in contexts where data used in connection with the relevant models is derived from a large geographic area, wide variances in population density and option data object density can be concealed in the model, resulting in modeling results that may not accurately reflect the context and situation of a particular, smaller geographic locality.

In some example implementations of embodiments of the invention, a number of approaches are taken to attempt to predict how a new option data object (such as a deal offer), will perform within a predetermined time period of its introduction. For example, the number of times a particular option data object may be selected and/or the rate at which a particular option data object may be selected within its first thirty (30) days of introduction may be predicted. In some such example implementations, the performance of a particular option data object may be expressed as a percentile score relative to the other option data objects that are scheduled to be introduced at or near the time when the particular option data object is introduced. In some example implementations, such percentile values can be converted to estimated values based at least in part on an extrapolation from the overall system performance (such as, the selection history of all option data objects presented in North America or another relevant geographic region over the past thirty days, for example) in a manner that may more accurately predict performance in a more localized area. Such predicted performance information can be incorporated into weighted values associated with an option data object (such as a score or ranking of deal offers, for example) to more efficiently assign impressions while in an Explore mode to confirm the popularity of a particular option data object and/or otherwise direct the limited available impressions for Explore-type usage to those option data objects that have a higher probability of being efficiently used in connection with Exploit-type impressions. By reducing or altogether avoiding the waste of impressions on option data objects that are not expected to be widely selected or otherwise popular, the efficiency of the system may be improved, and the problems associated with presenting low-interest or low-performing option data objects to a user may be avoided.

To solve and address these challenges and other related challenges, example implementations of embodiments of the invention model and determine a predicted performance level of an option data object (such as the expected rate at which a new option data object will be selected by system users, or the rate at which users will select a deal offer, for example) through the extraction of parameters associated with an option data object and the application of particularized rule sets associated with predictive models to the option data object and its parameters.

Some example implementations contemplate the use of a two-part ranking algorithm that incorporates: (1) the offline generation of a weighted value, such as a "Quality Prediction" value based at least in part on a predicted score associated with an option data object and (2) the online determination of a quality level or other threshold to be applied with determining whether to assign impressions to a new option data object and/or otherwise expose a new option data object to one or more users.

In some such example implementations, the offline component of the algorithm generally involves the performance of three functions: (1) data retrieval; (2) data processing, and (3) data upload. In some example situations, data retrieval is implemented in ruby and performed in connection with a curl command to an endpoint. In such example implementations, the QED endpoint responds with a Hadoop Distributed File System ("hdfs") path, where the relevant prediction information, such as opportunity prediction data or other information associated with an option data object will be stored upon collection. The location on the hdfs path can then be polled pending the arrival of the relevant data or the reaching of a configurable timeout condition. Once the relevant data is present in the location along the hdfs path, the location can be passed as input to a subsequent processing stage.

In some example implementations, the opportunity prediction data and/or other performance prediction data is calculated with respect to a large geographic area, such as for all new deal offers and/or other option data objects in North America, for example. In order to permit a finer-grained assessment of option data objects, assessed option data objects can be ranked within a division such as a more localized geographic area. In some such situations, it may be advantageous to convert raw scores or other weighted values associated with the predicted performance of an option data object into a percentile with respect to other option data objects within the same division.

In some example implementations, data processing is implemented in scala and performed on spark in a Hadoop cluster. In such implementations, the raw, previously retrieved data that was stored in the location that was established in connection with the data retrieval process, along with additional information about the deal offer or other option data object is read and processed. In some such implementations, the data is partitioned by a deal offer key, and then joined on a deal key basis. The data may also be repartitioned by locality or other geographic division. Subsequently, deal offers or other option data objects may be sorted within each division by their opportunity prediction score. In some such situations, it may be advantageous to convert the opportunity prediction score or other weighted value generated in connection with the partitioning of the data into a percentile within a particular division, and transformed into a new data element, which may be labeled or otherwise considered as a measure of expected option data object quality or performance, for example. In some such implementations, such percentile and/or other ranking information may be stored on hdfs in javascript object notation (j son), parquet, or similar data formats.

Uploading of the quality predictions, along with other deal related calculated data, is managed via an asynchronous data pipeline. The pipeline is configured through a configuration file with the types of data it is to upload. It collates this data into a single object and uploads it to an intermediary DaaS key value store (called Watson) via a batch upload process. This data is then indexed into our online deals index by a separate process responsible for indexing deals.

In some example implementations of the online portion of the process, the previously uploaded quality predictions or other relevant data is passed through a ratings processing algorithm to generate a score multiplier based on the percentile value associated with the deal offer or other option data object. In some implementations, such as those that involve a ratings function for each deal offer or other option data object is assigned to a group (or "bucket") based on predetermined ranges of percentile values, and a predetermined boost is associated with each group or bucket. This boost can be applied to a ranking value or other weighted value that can be used to compare new deal offers or other option data objects and determine which such deal offers or option data objects should be assigned impressions and exposed to users. In some example implementations, it may be particularly advantageous to limit the amount of time during which the boost is applied (such as for a few days, for example), to reflect the changing status of a particular deal offer or other option data object from "new" to non-new.

Figure 4A:
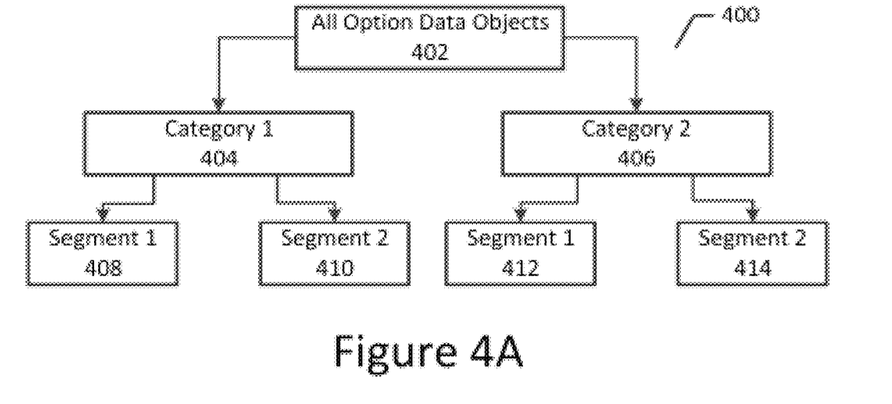
FIGS. 4A, 4B, and 4C illustrate example block diagrams of a predictive modeling structure that may be implemented and used in accordance with some embodiments of the present invention.
Figure 4B:
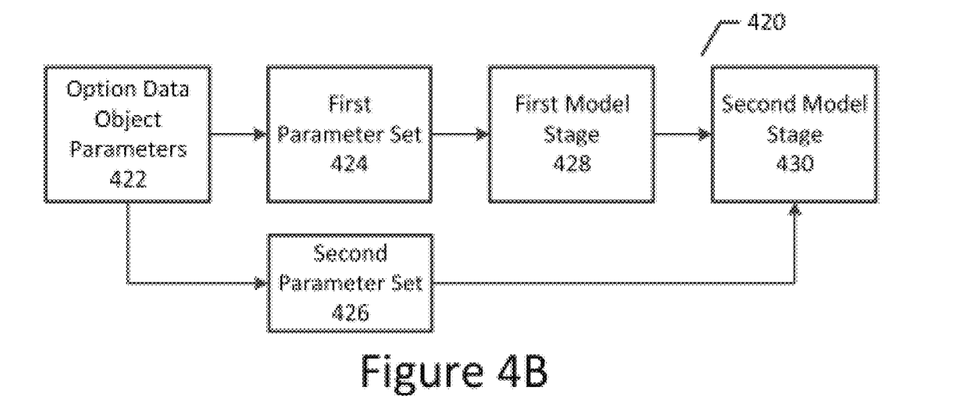
Figure 4C:
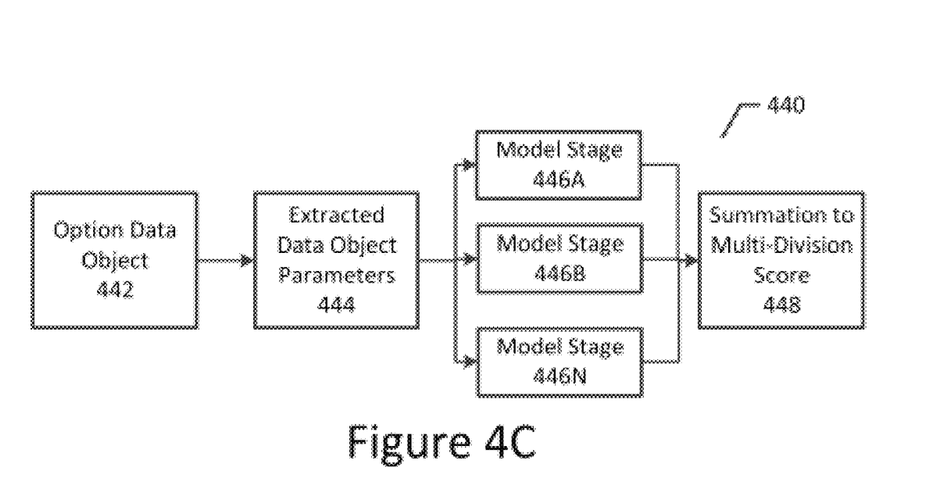

FIGS. 4A, 4B, and 4C illustrate example block diagrams of a predictive modeling structure that may be implemented and used in accordance with some embodiments of the present invention. Many example implementations of embodiments of the invention disclosed herein arise in contexts where a large number of option data objects, such as deal offers, are available to be presented to users. In many such situations, the number of option data objects will exceed the number of available impressions, and/or there will be a disparity between the number of impressions available at a given time and the number of impressions that would optimally be assigned to each available option data object. Moreover, in some situations option data objects are heterogeneous, at least in the sense that they have different characteristics and other parameters. For example, some option data objects may be available in only a limited geographic area, while others may generally be available in all areas in which a system may operate. In another example, some option data objects may be new, while others may have been available for some time. Option data objects may also differ from each other, particularly in situations where the option data objects are deal offers, in the nature of the deal offered, the related goods, services, or other resources associated therewith, the locations associated with the deal offer, and other aspects and details of the deal offers. As a result, it is advantageous in many situations to partition and/or otherwise divide the option data objects for processing based on one or more characteristics of the option data objects.

FIG. 4A shows an example flow structure 400 for dividing option data objects for processing in accordance with some implementations of embodiments of the invention. As shown in block 402, a collection of all of the option data objects available within a given system are divided into two groups and passed via separate channels to blocks 404 and 406, respectively. In some example implementations that arise in the context of deal offers, block 404 may be associated with a first category of option data objects, such as deal offers or other option data objects that can be categorized as multi-market (such as deal offers that are applicable to multiple different geographic areas or other markets), LIVE deal offers, and national deal offers, while block 406 may be associated with a second category of option data objects, such as deal offers or other option data objects that may be characterized as G1 deal offers or option data objects. In some instances, it may be particularly advantageous to build separate models form each of the different channels in G1, Multi-Market, and LIVE, particularly in situations where option data objects behave differently in different types of channels and where pairings of users to particular option data objects is advantageous from a relevance perspective.

As shown in FIG. 4A, the deal offers or other option data objects passed to each of blocks 404 and 406 are further divided into subcategories and passed to blocks 408 and 410, and 412 and 414, respectively, which each represent a particular subcategory or segment of option data objects. In some example implementations, blocks 408 and 412 may be associated with particular featured deal offers, while block 410 and 414 may be associated with re-featured deal offers. Regardless of the precise categorization and subcategorization criteria used to divide the option data objects into groups, each of the segments associated with blocks 408-414 are then applied to a particular predictive model. In some example implementations, the combination of all of the predictive models predict the total selection pattern of all option data objects over a given time period (such as the gross bookings for all available deal offers over a thirty day time period, for example). The combination of the models may also enable to prediction of the average percentile of gross bookings or other selection over the given time period.

FIG. 4B illustrates an example two-stage model structure 420 that may be used in connection with a given segment of option data objects, such as each of the segments associated with blocks 408-414 in FIG. 4A. As shown at block 422, each option data object is parsed so as to extract a series of option data object parameters. One set of such parameters, as shown at block 424, is passed to the first stage of the model, depicted at block 428, while a second set of the parameters, shown in FIG. 4B as block 426, is passed directly to the second stage of the model, which is depicted as block 430. In some example implementations, the set of option data object parameters included in block 424, which is passed to the first stage of the model, includes, but is not limited to, categorical features of a deal offer or other option data object, such as an identification of a related service, header information associated with the option data object, a location associated with the deal offer, a source of the deal offer, a subcategory associated with the deal offer, and/or other such information. In such implementations, the second set of option data object parameters, which are depicted at block 426, include the rest of the extracted option data object parameters. In some example implementations, it may be advantageous to extract and divide the option data object parameters such that the parameters passed to the first stage of the model 428 are mutually exclusive from those that are passed directly to the second stage of the model 430.

In some example implementations of the model structure 420, the first stage of the model 428 is a classification and regression tree (CART) model, and may take the form of a recursive partitioning and regression tree (RPART) model. In some such implementations, the first stage of the model 428 predicts selections of option data objects, such as gross bookings of deal offers for example, but only uses the categorical features passed to it, as shown by block 424. The first stage of the model 428 may also be optimized in the sense that the optimal number of observations as the tree nodes, cp value and/or depth of tree, for example, may be set based on a sampled dataset. As shown in FIG. 4B, the output of the first stage of the model 428 is passed to the second stage of the model 430. In some example implementations, the second stage of the model 430 may take the form of a random forest model, that predicts a selection value associated with an option data object, such as the predicted gross booking value of a deal offer.

Some example implementations contemplate deal offers or other option data objects that may be associated with multiple categories or other divisions such that a particular deal would be associated multiple segments, such as those shown at blocks 408-414 of FIG. 4A. As shown in FIG. 4C, an example model structure 440 recognizes that a deal offer or other option data object 442 may be associated with multiple segments, categories, or other divisions. At block 444, the extracted option data object parameters are divided on a division-by-division basis such that they can be passed to multiple instances of models 446A-446N. In some example implementations, each of models 446A-446N takes on the structure, function, and operation of the example model structure shown in FIG. 4B. As shown in block 448, each of the predictive values developed by each of models 446A-446N, such as the gross booking values calculated at block 430, for example, are summed at block 448 to create a multi-division selection value, such as a multi-division gross booking value associated with a deal offer.

In example implementations of the option data objects and related models discussed and contemplated herein, the option data object parameters may include both qualitative and quantitative information about the deal offer or other option data object, and the models may be configured to process such qualitative and quantitative information. In some example implementations, it may be advantageous to set and impose various thresholds on specific option data object parameters to allow for optimal option data object scoring and model training.

Regardless of the precise model structure used to predict and model the performance of the example implementations of embodiments of the invention contemplate using characteristics and other parameters associated with new option data objects, such as new deal offers, in connection with one or more predictive models to ascertain a likely performance level of a new option data object, such that new option data objects can be ranked and afforded impressions such that option data objects that are likely to be selected most frequently can be ranked higher than (and presented to users more frequently than) those new option data objects that are unlikely to be popular.

Figure 1:
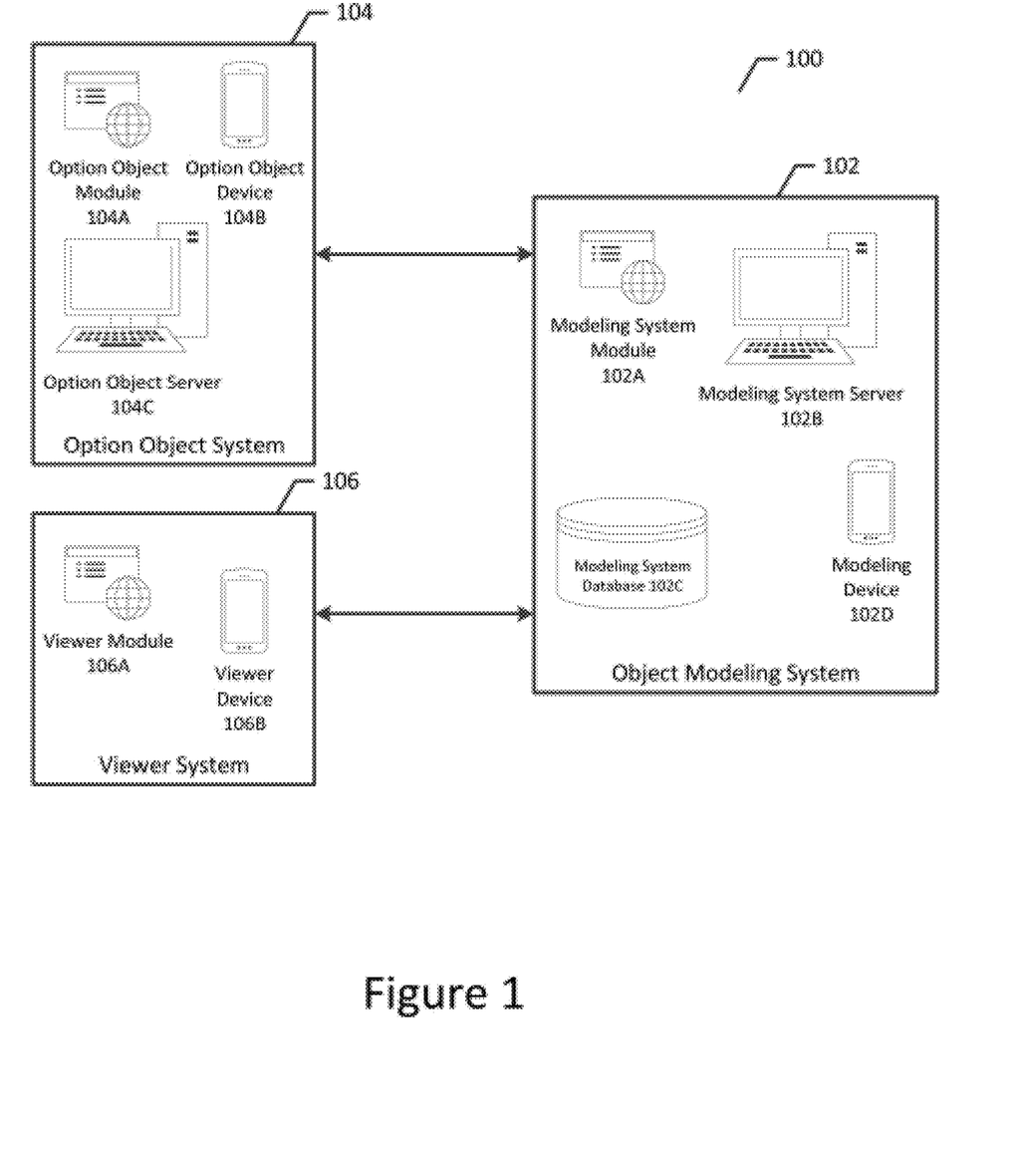
FIG. 1 illustrates an example system within which some embodiments of the present invention may operate.

FIG. 1 shows an example system environment 100 in which implementations involving the efficient prediction and modeling of the performance of option data objects may be realized. The depiction of environment 100 is not intended to limit or otherwise confine the embodiments described and contemplated herein to any particular configuration of elements or systems, nor is it intended to exclude any alternative configurations or systems from the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the prediction and modeling of the performance of option data objects prior to the introduction of the particular option data objects into the system based at least in part on the parameters and characteristics of the option data objects. Some such embodiments leverage a hardware and software arrangement or environment for request data object-to-network response asset pairing in accordance with the present invention.

As shown in FIG. 1, an object modeling system 102 includes an online object modeling system module 102A which is configured to receive, process, transform, transmit, communicate with and evaluate option data objects, content and other information associated therewith, and related interfaces via a web server, such as object modeling system server 102B and/or object modeling system device 102D. The object modeling system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, object modeling system 102 also includes an object modeling database 102C that may be used to store information associated with option data objects, parameters associated with option data objects, rule sets to be applied in connection with models used to predict and model the performance of option data objects, option object systems and/or content provided thereby or associated therewith, viewer systems and/or information provided thereby or associated therewith, and/or other information related to the prediction and modeling of the performance of option data objects, which can be accessed by the object modeling system module 102A, the object modeling system server 102B, and/or the object modeling system device 102D. While FIG. 1 depicts object modeling system database 102C as a single structure, it will be appreciated that object modeling system database 102C may additionally or alternatively be implemented to allow for storage in a distributed fashion and/or at facilities that are physically remote from the each other and/or the other components of object modeling system 102. Object modeling system 102 is also shown as including object modeling system device 102D which may take the form of a laptop computer, desktop computer, or mobile device, for example, to provide an additional means (other than via a user interface of the object modeling system server 102B) to interface with the other components of object modeling system 102 and/or other components shown in or otherwise contemplated by system environment 100.

Option data objects, option data object parameters and/or additional content, characteristics, or other information to be associated with one or more option data objects may originate from a content source system such as option object system 104. A user of option object system 104 may use an option object device 104B, such as a laptop computer, desktop computer, or mobile device, for example, to interface with an option object module 104A to generate option data object information and/or information to be included in an option data object, such as an option data object location, a weighted value associated with an option data object, other option data object parameters and characteristics, and/or other information to incorporate into and/or associate with an option data object and otherwise be processed by object filtering system 102. While only one option object system 104 is depicted in FIG. 1 in the interest of clarity, it will be appreciated that numerous other such systems may be present in system environment 100, permitting numerous content sources to develop and transmit content and other information associated with option data objects to object modeling system 102. In some instances, option object system 104 may also incorporate an option object server 104C. Such implementations may be particularly advantageous in situations where an option object system 102 interfaces with numerous other sources of option data objects, and compiles such option data objects through the interaction of option object module 104A and option object server 104C. For example, a plurality of option data objects may be in the form of deal offers that have not previously been presented to a particular viewer via a viewer device that is configured to interact with other system components within environment 100. In such a situation, option object system may generate, receive, and/or otherwise obtain a plurality of new deal offers, and transmit them to object modeling system 102, where object modeling system 102 is capable of applying one or more predictive models and/or other processes, including but not limited to those discussed in relation to FIGS. 4A-4C and otherwise discussed herein, to predict the relative performance of the new deal offers. The option object system 104 may also receive or otherwise ascertain information about parameters and other information associated with the option data object. Consequently, option object system 104 or a similar system can then pass a set of option data objects (the deal offers, in this example instance), which include and/or are otherwise associated with option object parameters and other information, to the object modeling system 102.

As shown in FIG. 1, system environment 100 also includes viewer system 106, which comprises a viewer module 106A and a viewer device 106B. While only one viewer system 106 is depicted in FIG. 1 in the interest of clarity, it will be appreciated that numerous additional such systems may be present in system environment 100, permitting numerous viewers to request and/or interact with one or more option data objects, and communicate with the object modeling system 102. Viewer device 106B may comprise and/or incorporate a laptop computer, desktop computer, mobile device, or the like, for example, and is configured to interface with a viewer module 106A to interact with object modeling system 102. The viewer system 106 is also capable of communicating with object modeling system 102 to provide information that the object modeling system 102 may need when determining whether and how present to a user option data objects that have been ranked and/or otherwise selected to be afforded one or more impressions based on weighted values assigned to the option data object, such as through the operation of one or more predictive models. For example, viewer system 106 may, such as via the capabilities of viewer device 106B receive an indication from a user of viewer system 106 that a user is interested in seeing option data objects that are associated with one or more categories in a particular location. In some example implementations, the location of a user may also be obtained for transmission to the object modeling system 102 through the use by the viewer system 106 of a global positioning system (GPS) interface, cellular location protocols, and/or other location protocols.

Overall, and as depicted in system environment 100, object modeling system 102 engages in machine-to-machine communication with option object system 104 and viewer system 106, via one or more networks, to facilitate the prediction and modeling of option object performance, such as through the calculation by predictive models of weighted values to be assigned to such deals or other option data objects received from option object system 104, and the transmission of a ranked subset of such option data objects to viewer system 106.

Figure 2:
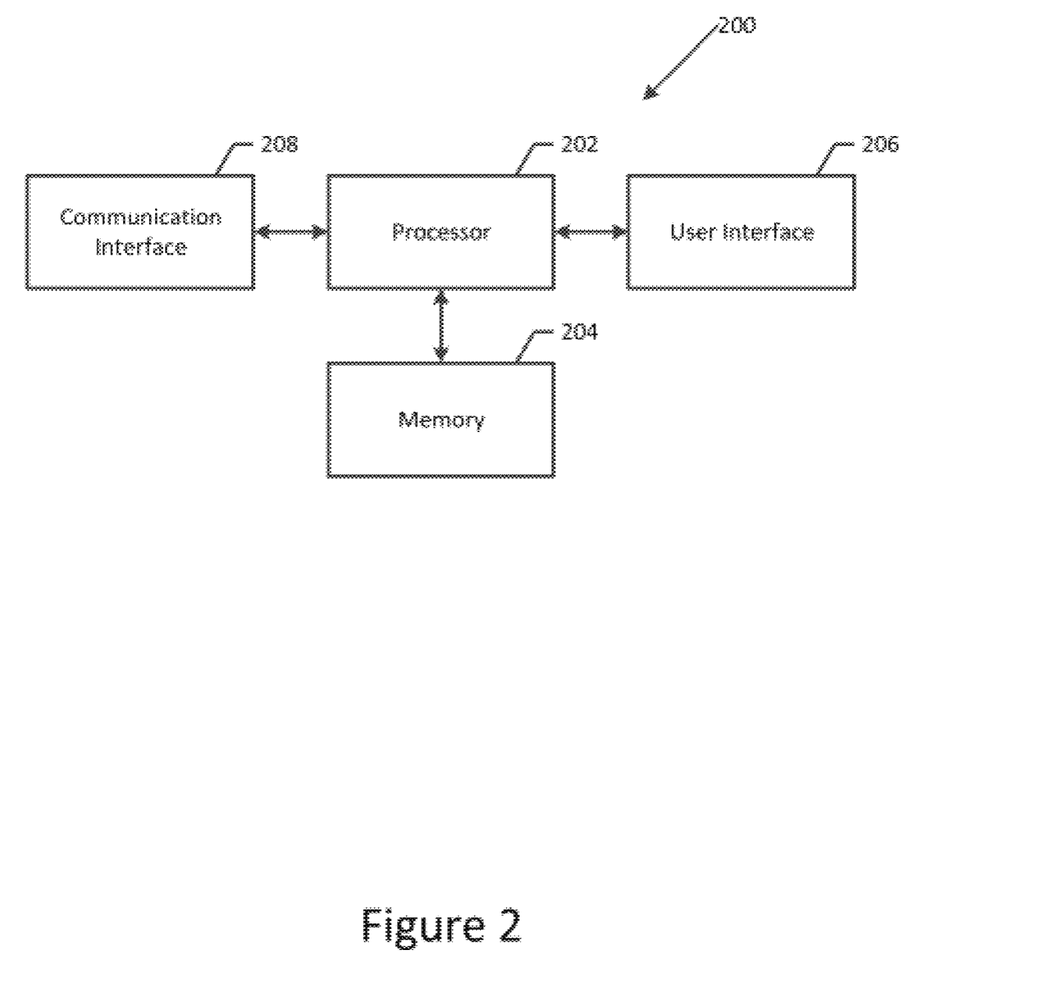
FIG. 2 illustrates a block diagram of an example device for implementing a data object generation system using special-purpose circuitry in accordance with some embodiments of the present invention.

The object modeling system 102 may be embodied by one or more computing systems, such as apparatus 200 shown in FIG. 2. As illustrated in FIG. 2, the apparatus 200 may include a processor 202, a memory 204, user interface 206, and communications interface 208. The apparatus 200 may be configured to execute any of the operations described herein, including but not limited to those described in connection with FIG. 1, FIG. 3, and FIGS. 4A-4C.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3:
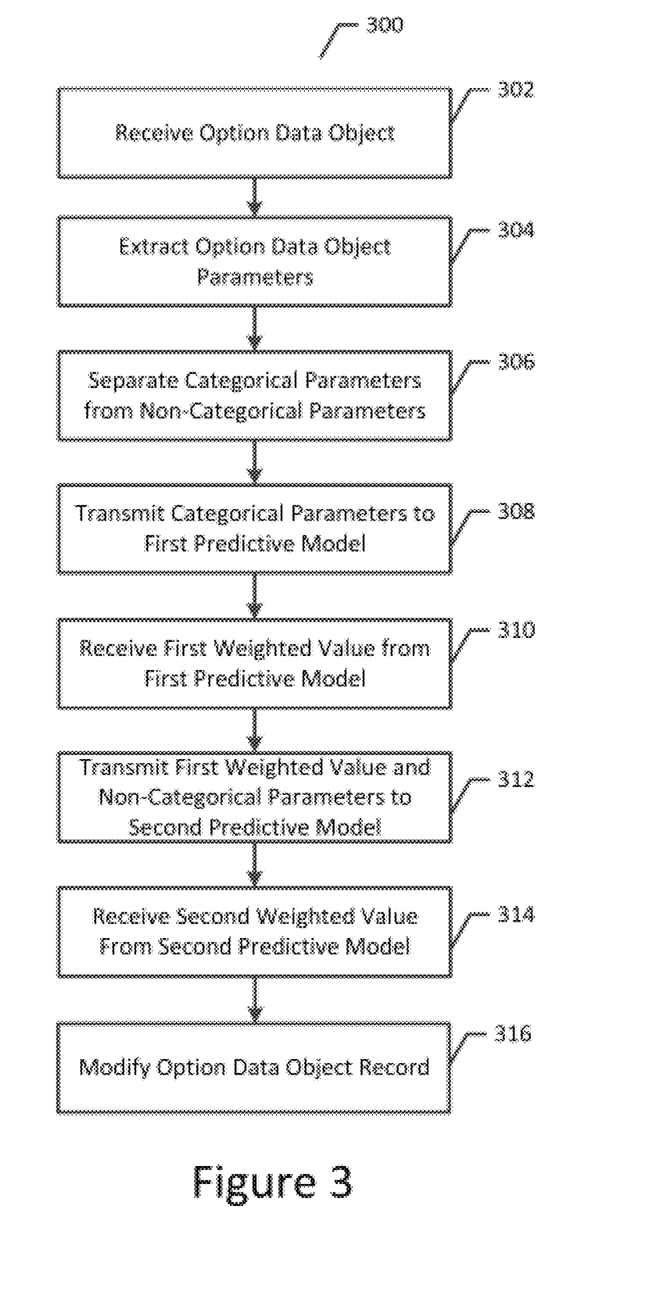
FIG. 3 illustrates an example data flow interaction between elements of an example device for generating menu data objects and interfaces associated with menu data objects in accordance with some embodiments of the present invention.

FIG. 3 is a block diagram illustrating a set of operations 300 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 3 and depicted or otherwise contemplated therein.

Many example implementations of the operations 300, the various devices capable of performing the operations 300 and/or other embodiments of the invention are particularly advantageous in contexts where option data objects take the form of deal offers. In many such situations, the number of impressions and/or the ability to otherwise expose an option data object to a user is limited. Consequently, many advantageous implementations are directed at modeling and predicting the performance of new deal offers or other new option data object prior to their presentation to users in order to ascertain whether it is efficient and/or otherwise beneficial to the system to expend impressions and/or other system resources on a particular new option data object.

As such, and as shown at block 302, the apparatus 200 is capable of receiving an option data object. As noted above, many implementations of embodiments of the invention arise in contexts where new option data objects such as new deal offers which have not been previously presented to users may be developed. In some such implementations, the apparatus 200 or a related device may receive one or such deal offers or other option data objects from an option object system 104 or other source of option data objects. Any approach to generating option data objects and any approach to receiving on or more option data objects may be used in connection with implementations of block 302.

As shown at block 304, the apparatus 200 is also capable of extracting a set of option data object parameters from the received option data object. Implementations of block 304 contemplate option data objects that include a set of categorical parameters that are associated with the option data object, such as a location associated with the option data object, a service associated with the option data object, service header information associated with the option data object, a source of the option data object and/or other information that can be used to assign an option data object to a particular category and/or subcategory. Implementations of block 304 also contemplate option data objects that include a set of non-categorical option parameters, such as additional details about the particular option data object and/or the optional action associated therewith. Any approach to extracting the set of option data object parameters may be used, and may be dependent on the particular structure and nature of the option data object. Some of the parameters may include, but are not limited to an identification of the structure of a particular option data object, past performance information, sales information, inventory information, location data, data associated with or derived from a third party, information regarding a potentially competing option data object and/or entity, demand information, and or other information used in connection with another modeling stage.

As shown at block 306, the apparatus 200 is also capable of separating the set of categorical parameters from the set of non-categorical parameters. With reference to FIG. 4B, some example implementations of embodiments of the invention contemplate routing different types of option object parameters differently through a given model structure. In some such implementations, such as those involving block 306 or similar aspects, for example, an object modeling system such as object modeling system 102, operate on the extracted set of option data object parameters to separate different groups of parameters. In some example implementations, it may be advantageous to store the separated parameters separately, such as in different locations within modeling system database 102C. However, any approach to separating categorical parameters from non-categorical parameters may be used in implementations of block 306.

As shown in block 308, the apparatus 200 is also capable of transmitting to a first predictive model the set of categorical parameters. In implementations of block 308, the first predictive model may be a classification and regression tree (CART) model, such as that referenced above with respect to block 428 of FIG. 4. In some example implementations, it may be particularly advantageous to implement this first predictive model as an RPART model. Regardless of the particular type or structure of the CART model applied in block 308, it may be particularly advantageous to use the categorical parameters (which typically can take the form of a relatively wide range of distinct values) in manner that creates a relatively input signal to the model. In some implementations where the categorical parameters are qualitative in nature, such parameters may be structured in a manner that they encompass a relatively high number of unique values, so as to allow the CART model to recognize and capture the maximum variance among the categorical parameters.

As shown in block 310, the apparatus 200 is also capable of receiving from the first predictive mode a first weighted value associated with the option data object. As noted above with the respect to block 308, a set of categorical parameters is applied to a CART model. This model responsively generates an output signal in the form of a weighted value associated with the option data object. In some particularly advantageous implementations, this weighted value captures and reflects a high degree of variance amongst option data objects and the parameters associated with those option data objects. In some example implementations, the apparatus 200 may retrieve or otherwise receive the first weighted value through communication with one or more components associated with the object modeling system 102, such as when the first weighted value is stored in the modeling system database 102C. However, any approach to receiving the output of a predictive model may be used in connection with implementations of block 310.

As shown in block 312, the apparatus 200 is also capable of transmitting to a second predictive model the first weighted value and the set of non-categorical parameters. In example implementations of block 312, the second predictive model is in the form of a random forest model, such as the model shown in FIG. 4B at block 430. Any of the approaches used to in connection with transmitting values and/or parameters to a model in block 308 may be used in implementations of block 312. In some situations, it may be advantageous to tune the second predictive model to optimize for the maximum correlation and minimum RMSE between actual and predicted performance data, such as the gross bookings value for a particular option data object. In some such situations, the parameters that may be tuned include the number of trees in the random forest model (ntree), the variables picked randomly at each node (mtry), and the minimum number of observations at each node.

As shown in block 314, the apparatus 200 is also capable of receiving from the second predictive model a second weighted value associated with the option data object. In implementations of block 314, the second weighted value comprises a predicted performance level of the option data object. For example, the performance level may reflect a rate at which users are likely to select a particular option data object, such as an anticipated gross bookings level or percentile of a deal offer, for example. Any approach to receiving a weighted value from a predictive model, including those that may be used in connection with implementations of block 310, may be used in connection with implementations of block 314.

As shown at block 316, the apparatus 200 is also capable of modifying a data record associated with the option data object. As discussed elsewhere herein, many implementations of embodiments of the invention are directed to predicting the performance level of a new option data object, such as a deal offer that has not yet been presented to users or other members of the public. As such, it may be particularly advantageous to associate in a database, such as modeling system database 102C, the predicted performance level of the option data object with other information about that option data object. In such situations, the predicted performance levels of a group of new option data objects can be compared against each other and used in sorting and/or otherwise selecting a subset of option data object to be exposed to users through the use of impressions and/or other approaches. Moreover, modifying a data record associated with a particular option data object to include the generated predicted performance level may facilitate the validation and/or further training of the predictive models contemplated herein. For example, if the actual performance of an option data object diverges significantly from the predicted performance level, it may be advantageous to be able to ascertain what the predicted performance level of the option data object was at a given time. In some situations, it may be advantageous to modify the data record to reflect demand for an option data object and/or other indications of potential demand for the option data object.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart supports combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory coupled to the processor, wherein the processor is configured to at least:

receive an option data object;
extract from the option data object a set of option data object parameters, wherein the option data object parameters include:
a set of categorical parameters; and
a set of non-categorical parameters;
separate the set of categorical parameters from the set of non-categorical parameters;
transmit to a first predictive model the set of categorical parameters, wherein the first predictive model comprises a classification and regression tree (CART) model;
receive from the first predictive model a first weighted value associated with the option data object;
transmit to a second predictive model the first weighted value and the set of non-categorical parameters, wherein the second predictive model comprises a random forest model;
receive from the second predictive model a second weighted value associated with the option data object, wherein the second weighted value comprises a predicted performance level of the option data object;
modify a data record associated with the option data object to include the second weighted value; and
based at least in part on the modified data record, wherein the modified data record comprises an indication if the associated option data object has not previously been presented, cause a reallocation of a set of resources associated with the option data object, wherein the causing a reallocation of a set of resources associated with the option data object is based at least in part on if the associated option data object has not previously been presented.

2. The apparatus of claim 1, wherein the set of categorical parameters comprises an identification of a location associated with the option data object.

3. The apparatus of claim 1, wherein the set of non-categorical parameters comprises an identification of a structure of the option data object.

4. The apparatus of claim 1, wherein the predicted performance level is a predicted selection rate of the option data object.

5. The apparatus of claim 4, wherein the predicted selection rate of the option data object is
a predicted rate at which a plurality of users of a network will select the option data object within a predefined period of time after an introduction of the option data object into the network.

6. The apparatus of claim 5, wherein modifying a data record associated with the option data object to include the second weighted value comprises associating the predicted selection rate with the set of option data object parameters.

7. The apparatus of claim 1, wherein causing a reallocation of a set of resources associated with the option data object comprises assigning a set of impressions to an option data object.

8. The apparatus of claim 1, wherein the causing a reallocation of a set of resources associated with the option data object is further based at least in part on if the predicted performance level is above a threshold.

9. A computer program product comprising at least one non-transitory computer-readable storage medium having computer-executable program code instruction stored therein, the computer-executable program code instructions comprising program code instructions configured to:
receive an option data object;

extract from the option data object a set of option data object parameters, wherein the option data object parameters include:
a set of categorical parameters; and
a set of non-categorical parameters;
separate the set of categorical parameters from the set of non-categorical parameters;
transmit to a first predictive model the set of categorical parameters, wherein the first predictive model comprises a classification and regression tree (CART) model;
receive from the first predictive model a first weighted value associated with the option data object;
transmit to a second predictive model the first weighted value and the set of non-categorical parameters, wherein the second predictive model comprises a random forest model;
receive from the second predictive model a second weighted value associated with the option data object, wherein the second weighted value comprises a predicted performance level of the option data object;
modify a data record associated with the option data object to include the second weighted value; and
based at least in part on the modified data record, wherein the modified data record comprises an indication if the associated option data object has not previously been presented, cause a reallocation of a set of resources associated with the option data object, wherein the causing a reallocation of a set of resources associated with the option data object is based at least in part on if the associated option data object has not previously been presented.

10. The computer program product of claim 9, wherein the set of categorical parameters comprises an identification of a location associated with the option data object.

11. The computer program product of claim 9, wherein the set of non-categorical parameters comprises an identification of a structure of the option data object.

12. The computer program product of claim 9, wherein the predicted performance level is a predicted selection rate of the option data object.

13. The computer program product of claim 12, wherein the predicted selection rate of the option data object is a predicted rate at which a plurality of users of a network will select the option data object within a predefined period of time after an introduction of the option data object into the network.

14. The computer program product of claim 13, wherein modifying a data record associated with the option data object to include the second weighted value comprises associating the predicted selection rate with the set of option data object parameters.

15. The computer program product of claim 9, wherein causing a reallocation of a set of resources associated with the option data object comprises assigning a set of impressions to an option data object.

16. The computer program product of claim 9, wherein the causing a reallocation of a set of resources associated with the option data object is further based at least in part on if the predicted performance level is above a threshold.

17. A method for option data object performance prediction and modeling, the method comprising:
receiving an option data object;
extracting from the option data object a set of option data object parameters, wherein the option data object parameters include:
a set of categorical parameters; and
a set of non-categorical parameters;
separating the set of categorical parameters from the set of non-categorical parameters;
transmitting to a first predictive model the set of categorical parameters, wherein the first predictive model comprises a classification and regression tree (CART) model;
receiving from the first predictive model a first weighted value associated with the option data object;
transmitting to a second predictive model the first weighted value and the set of non-categorical parameters, wherein the second predictive model comprises a random forest model;
receiving from the second predictive model a second weighted value associated with the option data object, wherein the second weighted value comprises a predicted performance level of the option data object;
modifying a data record associated with the option data object to include the second weighted value; and
based at least in part on the modified data record, wherein the modified data record comprises an indication if the associated option data object has not previously been presented, causing a reallocation of a set of resources associated with the option data object, wherein the causing a reallocation of a set of resources associated with the option data object is based at least in part on if the associated option data object has not previously been presented.

18. The method of claim 17, wherein the set of categorical parameters comprises an identification of a location associated with the option data object and wherein the set of non-categorical parameters comprises an identification of a structure of the option data object.

19. The method of claim 17, wherein the predicted performance level is a predicted selection rate of the option data object.

20. The method of claim 19, wherein the predicted selection rate of the option data object is a predicted rate at which a plurality of users of a network will select the option data object within a predefined period of time after an introduction of the option data object into the network.

21. The method of claim 20, wherein modifying a data record associated with the option data object to include the second weighted value comprises associating the predicted selection rate with the set of option data object parameters.

22. The method of claim 17, wherein causing a reallocation of a set of resources associated with the option data object comprises assigning a set of impressions to an option data object.

23. The method of claim 17, wherein the causing a reallocation of a set of resources associated with the option data object is further based at least in part on if the predicted performance level is above a threshold.

* * * * *